United States Patent [19]

Efimov et al.

[11] 4,349,430
[45] Sep. 14, 1982

[54] APPARATUS FOR ELECTROCHEMICAL PURIFICATION OF CONTAMINATED LIQUIDS

[76] Inventors: Vyacheslav T. Efimov, ulitsa Sumskaya, 59, kv. 2; Miron M. Nazarian, ulitsa Bljukhera, 13, kv. 138; Vladimir A. Kolyada, ulitsa Petrozavodskaya, 91 "A", kv. 20; Arkady R. Mataev, ulitsa Timurovtsev, 19, kv. 130; Ljudmila F. Shamsha, ulitsa Dinamovskaya, 3, kv. 23.; Alexandr A. Axenko, ulitsa Bairona, 152, kv. 25, all of Kharkov, U.S.S.R.

[21] Appl. No.: 162,748

[22] Filed: Jun. 25, 1980

[51] Int. Cl.³ .............................................. C02F 1/46
[52] U.S. Cl. ..................................... 204/302; 204/149; 204/306
[58] Field of Search ............................. 204/302–308, 204/186, 149

[56] References Cited

U.S. PATENT DOCUMENTS 3,505,188  4/1970  Pei-Tai Pan ........................ 204/149
3,855,103  12/1974  McLaren et al. .................... 204/306
4,040,926  8/1977  Oberton ............................. 204/186

Primary Examiner—Delbert E. Gantz
Assistant Examiner—William Leader
Attorney, Agent, or Firm—Robert E. Burns; Emmanuel J. Lobato; Bruce L. Adams

[57] ABSTRACT

An apparatus for electrochemical purification of contaminated liquids comprises a settling chamber having an outlet pipe to discharge purified liquid and communicating with an electrocoagulation chamber having soluble electrodes and inlet pipes to feed contaminated liquid and electrolyte, respectively. The apparatus also incorporates piping to return the purified liquid whose purification degree is less than the set value from the settling chamber to the electrocoagulation chamber for re-purification and a purification degree controller which includes a liquid purification degree analyzer, a control unit, and actuating means serving to interrupt the discharge of the purified liquid and the supply of the contaminated liquid and of the liquid whose purification degree is less than the set value, said analyzer, control unit, and actuating means being electrically interconnected.

2 Claims, 2 Drawing Figures

APPARATUS FOR ELECTROCHEMICAL PURIFICATION OF CONTAMINATED LIQUIDS

BACKGROUND OF THE INVENTION

1. Field of the Invention

The present invention relates to apparatus for purifying contaminated liquids and more particularly to apparatus for electrochemical purification of contaminated liquids.

The invention may be employed for purifying liquids contaminated with organic substances, mechanical suspensions, surfactants, and the like.

The invention is particularly useful for purifying liquids contaminated with polymers and petroleum products, such as waste water containing oils and greases.

2. Description of the Prior Art

Of all the known devices for purifying contaminated liquids, the widest and ever increasing application has recently been found by apparatus for electrochemical purification of liquids, in particular those where liquid is purified by the electroflotation and electrocoagulation methods, which is due to their high performance capabilities.

Apparatus are known where the electrochemical liquid purification process is accomplished either periodically, i.e. in batches, or continuously. The latter appear to be more promising. Such apparatus ordinarily comprise a settling chamber communicating with an electroflotation or electrocoagulation chamber fitted with electrodes. The apparatus comprising an electrocoagulation chamber with soluble electrodes, where also flotation is accomplished, will be discussed hereinafter. The highest economic efficiency and purification rate are offered by the apparatus wherein contaminated liquid is mixed with the electrode dissolution products in the electrocoagulation chamber above the electrodes, since this prevents fouling the electrode surface by impurities contained in the contaminated liquid. For example, an apparatus for electrochemical purification of waste water (USSR Inventor's Certificate No. 644,738) comprises a settling chamber with outlet pipes to discharge purified liquid and sludge, which settling chamber communicates with an electrocoagulation chamber installed therewithin and having in its bottom part a system of soluble electrodes and an inlet pipe to feed electrolyte.

A serious disadvantage of this apparatus is that the degree of purification of the contaminated liquid falls as the concentration of impurities in the liquid increases. The degree of liquid purification can be upgraded by increasing the current density at the electrodes, but this way, apart from a higher consumption of both the power and the electrodes, will result in a poor stability of the liquid purification quality, since a liquid purified to a degree below the specified one, having passed the settling chamber, is discharged from the apparatus.

SUMMARY OF THE INVENTION

The principal object of the present invention is to upgrade the stability of the quality of purification in an apparatus for electrochemical purification of contaminated liquids.

Another object of the invention is to exclude the discharge from the apparatus of the purified liquid whose purification degree is less than the set value.

The above-mentioned and other objects of the invention are attained when an apparatus for electrochemical purification of contaminated liquids, comprising a settling chamber with an outlet pipe to discharge purified liquid, said settling chamber communicating with an electrocoagulation chamber having soluble electrodes and inlet pipes to feed contaminated liquid and electrolyte, according to the invention, incorporates a pipe to return the purified liquid whose purification degree is less than the set value from the settling chamber to the electrocoagulation chamber for re-purification, of a purification degree controller having a liquid purification degree analyzer, a control unit, and actuating means which interrupt the discharge of the purified liquid and the feed of the contaminated liquid and of the liquid whose purification degree is less than the set value, said analyzer, control unit, and actuating means being electrically interconnected.

The provision in the apparatus for electrochemical purification of contaminated liquids of a pipe to return the purified liquid whose purification degree is less than the set value from the settling chamber to the electrocoagulation chamber for re-purification and of a purification degree controller precludes the discharge from the apparatus of inadequately purified liquid over the entire time of the apparatus operation and thereby upgrades the stability of the contaminated liquid purification quality.

To reduce the amount of the liquid returned for re-purification and to enhance the efficiency of the apparatus for electrochemical purification of contaminated liquids, it is advisable that its settling chamber be divided by a partition into a top and a bottom space so that the top space communicates with the bottom space by a pipe wherein a liquid purification degree analyzer and an actuating means are installed, and with the electrocoagulation chamber, by a pipe wherein an actuating means is installed as well.

BRIEF DESCRIPTION OF THE DRAWINGS

The exact nature of the invention will now be explained by a detailed description of embodiments thereof with reference to the accompanying drawings, in which.

DETAILED DESCRIPTION OF THE INVENTION

Figure 1:
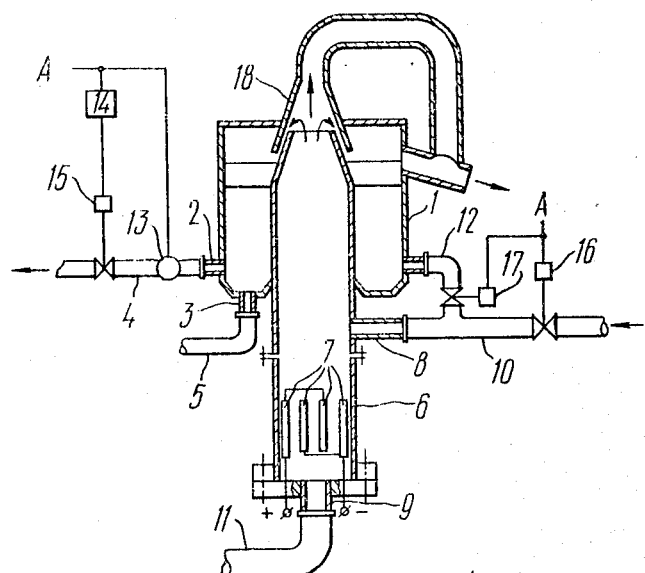
FIG. 1 is a diagrammatic sectional view of an apparatus for electrochemical purification of contaminated liquids, constructed in accordance with the present invention.

Described hereinafter are embodiments of the invention with reference to the accompanying drawings.

An apparatus for electrochemical purification of contaminated liquids (FIG. 1) comprises a settling chamber 1 with outlet pipes 2, 3 connected to pipes 4, 5 to discharge purified liquid and sludge respectively. The settling chamber 1 communicates with an electrocoagulation chamber 6 installed therewithin and having soluble electrodes 7 and inlet pipes 8, 9 connected to pipes 10, 11 to feed contaminated liquid and electrolyte respectively into the electrocoagulation chamber 6. The apparatus incorporates a pipe 12 to return the purified liquid whose purification degree is less than the set value to the electrocoagulation chamber for re-purification and a purification degree controller. The latter includes a liquid purification degree analyzer 13 installed in the pipe 4, a control unit 14, and actuating means 15, 16, 17 in the form of solenoid shut-off valves installed respectively in the pipe 4 to discharge purified liquid, in the pipe 10 to feed contaminated liquid, and in the pipe 12 to return purified liquid for re-purification, the analyzer 13, control unit 14, and actuating means 15, 16, 17 being electrically interconnected. Used as the liquid purification degree analyzer may be an optical liquid transparency analyzer, an electrochemical liquid electrical conductivity analyzer, a liquid density analyzer, etc.

A device 18 to remove foam from the apparatus is also shown in FIG. 1.

Figure 2:
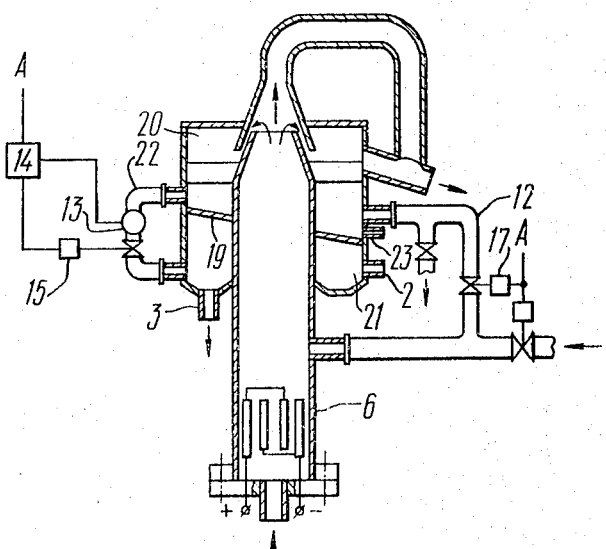
FIG. 2 is a diagrammatic sectional view of a modification of the apparatus, comprising a partition in the settling chamber.

FIG. 2 illustrates a more efficient apparatus for electrochemical purification of contaminated liquids, which differs from the above-described one in that its settling chamber 1 is divided by partition 19 into a top space 20 and a bottom space 21. The top space 20 communicates with the bottom space 21 through a pipe 22 wherein the liquid purification degree analyzer 13 and the actuating means 15 are installed, and with the electrocoagulation chamber 6, through the pipe 12 wherein the actuating means 17 is installed. The top space 20 is also provided with an outlet pipe 23 to discharge sludge. The partition 19 is preferably inclined to facilitate the sludge discharge.

The proposed apparatus for electrochemical purification of contaminated liquids operates as follows. Before starting the treatment of contaminated liquid, the inner spaces of the electrocoagulation chamber 6 (FIG. 1) and of the settling chamber 1 are through the inlet pipe 9 filled with pure electrolyte (industrial water with additions of hydrochloric acid or sodium chloride), following which electric current is applied to the soluble electrodes 7, and after some interval (25–30 s) the contaminated liquid feed through the inlet pipe 8 into the electrocoagulation chamber 6 is started.

In the course of the anodic dissolution of the soluble electrodes 7, metal hydroxides are formed and gas (hydrogen) bubbles originate on the electrodes. The metal hydroxides are carried by the gas bubbles up the electrocoagulation chamber 6 and, encountering a contaminated liquid stream, coagulate the impurities contained in the liquid into aggregates.

The liquid thus treated together with the aggregates of coagulated impurities and hydroxides, contained therein, passes into the settling chamber 1 where foam and sludge separate from the purified liquid. The foam is removed by the device 18, the sludge is discharged via the outlet pipe 3, and the purified liquid, via the outlet pipe 2. When the degree of liquid purification turns out to be less than the set value, the analyzer 13 delivers a signal to the control unit 14 which produces control signals applied to the actuating means 15, 16, 17. The actuating means 15, 16 shut off the pipes 4 and 10 (i.e. the discharge of purified liquid and the feed of contaminated liquid are interrupted), while the actuating means 17 opens the pipe 12, with the result that the liquid purified to a degree less than the set value flows via the pipe 12 from the settling chamber 1 to the electrocoagulation chamber 6 for re-purification.

As the preset degree of liquid purification has been attained, the analyzer 13 delivers a signal to the control unit 14 which then produces control signals causing the actuating means 15, 16 to open the pipes 4 and 10 and the actuating means 17 to shut off the pipe 12.

In the apparatus provided with the partition 19 installed in the settling chamber 1 and dividing the latter into the top and the bottom space or zones and with the pipe 22 interconnecting the two spaces or zones, when the content of impurities exceeds the set value, the analyzer 13 delivers a signal to the control unit 14 which through the actuating means 15, 16 interrupts the feed of purified liquid from the top space of the settling chamber 1 to the bottom space thereof as well as the feed of contaminated liquid into the electrocoagulation chamber 6 and simultaneously through the actuating means 17 opens the pipe 12.

As the preset degree of liquid purification has been attained, the analyzer 13 delivers a signal to the control unit 14 which through the actuating means 17 interrupts the liquid feed for re-purification and simultaneously through the actuating means 15, 16 opens the pipes 10 and 22.

Testing the proposed apparatus in the purification of cutting fluid (a highly concentrated waste water containing impurities and characterized by a considerable aggregation stability) with an initial impurity content of 1.5 to 6.4 g/l for 150 hours of continuous operation have shown that deviations of the purification degree from the set value over the entire period of operation did not exceed 4.0% and the liquid purification degree was 98.5 to 98.8%. The purified liquid contained 10 to 30 mg/l of impurities.

A comparative test, under similar purification conditions, or an apparatus constructed according to USSR Inventor's Certificate No. 644,738 has shown the deviations of the purification degree from the set value to amount to 7–24% and the content of impurities in the purified liquid to be as high as 40–180 mg/l.

It will be understood that the present invention is not intended to be limited to the embodiments thereof, described and shown hereinabove, and that various alterations and modifications of the proposed apparatus for electrochemical purification of contaminated liquids may be made without departing from the spirit and scope of the present invention.

What is claimed is:

1. Apparatus for continuous electrochemical purification of contaminated liquids comprising, an electrocoagulation chamber for containing an electrolyte and having soluble electrodes therein, means to introduce said electrolyte into said electrocoagulation chamber, means to introduce contamination liquid into said electrocoagulation chamber while it contains said electrolyte, said electrocoagulation chamber being open at the top, a settling chamber disposed circumferentially about said electrocoagulation chamber for receiving liquid from the electrocoagulation chamber after treatment of the contaminated liquid to coagulate impurities therein, a discharge conduit above the level of the bottom of the settling chamber to discharge purified liquid from the settling chamber, a liquid purification degree analyzer, actuating means under control of said analyzer to interrupt the discharge of the purified liquid and introduction of contaminated liquid when the degree of purification of the purified liquid discharged from the settling tank is below a given level, means under control of said analyzer to recirculate the purified liquid from the settling chamber to said means to introduce the contaminated liquid into said electrocoagulation chamber for repurification when said purification is below said given level, a partition in said settling chamber dividing it into a top space and a bottom space, a conduit connecting said top space and said bottom space, and said liquid purification degree analyzer being disposed to analyze liquid in said conduit.

2. An apparatus for continuous electrochemical purification of a contaminated liquid, comprising:
- a settling chamber having a branch pipe in a top zone thereof to discharge purified liquid;
- an electrocoagulation chamber for containing an electrolyte and having energizable soluble electrodes positioned therein;
- means for supplying the electrolyte to said electrocoagulation chamber;
- means for supplying the contaminated liquid to the electrocoagulation chamber, said electrocoagulation chamber being open in its top for communicating with said settling chamber, said settling chamber being positioned circumferentially around said electrocoagulation chamber to receive the liquid therefrom through said open top after the contaminated liquid has been treated thereby to coagulate the impurities therein;
- a discharge conduit provided above the bottom of a bottom zone of the settling chamber, to discharge purified liquid therefrom;
- a partition in the settling chamber dividing it into said top zone and said bottom zone;
- a conduit connecting the top zone with the bottom zone of the settling chamber, and means comprising a liquid purification degree analyzer provided for analyzing the liquid in said conduit to control transfer of liquid from said top zone to said lower zone when the purification of the liquid in the top zone is below a selected level and to recirculate the liquid into said electrocoagulation chamber for further treatment.

* * * * *